3,065,141
SEPARATION OF NUCLEOPROTEINS AND NUCLEIC ACIDS FROM AQUEOUS PROTEIN MIXTURES
Albert E. Gessler, 1810 Mohawk Trail, Maitland, Fla.;
Charles E. Bender, 61 Mill Rock Road, New Paltz,
N.Y.; and Martin Parkinson, 62 Market St., Poughkeepsie, N.Y.
No Drawing. Filed Aug. 24, 1960, Ser. No. 51,540
8 Claims. (Cl. 167—74)

This invention is concerned with the separation of nucleoproteins, and related products like nucleic acids from mixtures with other protein materials. Its main object is the provision of a simple, rapid, and economical method for effecting such separation, by means nontoxic to the nucleoprotein material, so that it can be obtained viable and free of the other proteins, and vice versa, for the purpose of scientific study, or for such other uses as may be desired for the pure material. Our invention involves the discovery that certain halofluorocarbons have the ability to accomplish the separation cleanly, rapidly, and without the danger of introducing chemicals toxic to the materials being separated.

Many of the active biological agents (e.g. viruses, bacteria, body fluids) contain nucleic acid in their structure as the bearer of their active principle, generally in the form of nucleoproteins. They are ordinarily found associated with proteins containing no nucleic acid residues, and their reactions are often masked and influenced by these associated proteins. In order to study and use these very important nucleoprotein materials, it is essential to separate them from the accompanying proteins. Since active nucleoproteins are closely related in many chemical and physical properties to other proteins, the separation problem is difficult. Sometimes elaborate expensive chemical or physical purification processes (e.g. high speed centrifugation or ultrafiltration) are used. In every case, relative freedom from accompanying proteins can be obtained only at the expense of substantial dilution of the active agent, generally at high cost and after laborious work often accompanied by more or less denaturization of the materials.

We have discovered that saturated carbon fluorine compounds containing no other substituents than hydrogen, bromine and chlorine, and in which all the halogens are attached to alkyl carbon atoms, have the ability to remove proteins other than nucleoproteins from aqueous fluids, without introducing elements into the fluids which are injurious to the active nucleoprotein ingredients.

Most advantageous results are obtained with carbon fluorine compounds, additionally substituted with only hydrogen, bromine and/or chlorine, in which all the halogen is tightly held against reaction. Such compounds include (1) all saturated aliphatic and alicyclic compounds containing from 1 to 4 carbon atoms, at least 2 halogen atoms, at least 1 fluorine atom for each 2 carbon atoms, and in which any monohalogen substituted alkyl radical is alpha to a polyfluorosubstituted carbon atom and (2) methyl benzenes in which all the hydrogens of the methyl groups are replaced by fluorines.

Most preferably, the extraction medium is used in liquid form to insure maximum contact between the two phases of halofluorocarbon and aqueous liquid, while emulsified together. Since we prefer to operate under ordinary ambient conditions, without the necessity for pressure, we prefer to use extracting agents which have boiling points above approximately 40° C. Optimum separation, with minimum loss of active ingredients is obtained when the specific gravity of the liquid is adjusted to a range between 1.1 to about 1.6.

In our method, we need pay no attention to original protein concentration, and can use cellular tissue, which is often richest in the active nucleoprotein ingredient. In this case, the tissue is ground and homogenized with an aqueous fluid, and is then intimately mixed with the halofluorocarbon, most preferably emulsified with it. The emulsion is then either allowed to break by itself or is broken by short low speed centrifugal action into separate strata. The proteins will be found to have accumulated in the bottom layer with the fluorocarbon, while the aqueous fluid on top contains the nucleic acids and nucleoproteins, practically free of accompanying proteins. This separation is substantially complete in a single extraction.

Where halofluorocarbons alone are used to make the separation, there may be some loss of active nucleoprotein ingredient, particularly when the specific gravity of the fluorocarbon is very high. We have found that dilution of the fluorocarbons with solvents of low toxicity and low specific gravity such as the alkanes (e.g. n-hexane, n-heptane) to a specific gravity of 1.6 or lower, reduces this loss markedly. Good separations are obtainable down to a specific gravity of about 1.1 with optimum results at 1.25 S.G. Below 1.1 S.G., separation of the two strata becomes less sharp. It should be noted that the separation can be made even below the S.G., of 1.0; but it is not sharp, and repeated extractions are necessary.

The diluent used with the fluorocarbon should of course be of minimum toxicity, and should be of such a boiling point or evaporation rate that it corresponds generally to that of the fluorocarbon being used. We find the n-alkanes to be particularly useful (e.g. n-hexane, n-heptane).

The ability to separate proteins from nucleoproteins etc. is shown by all the halofluorocarbons we have tested, and in which the halogen is fluorine, chlorine or bromine and the halogen and fluorine are attached to an alkyl group. However, those that are gases at room temperatures require pressure reactions, and even those that liquefy at low pressures are difficult to handle, and inconvenient to use.

Among the low-boiling liquids and easily liquified gases which may be used are:

$CF_3$-CHCL-$CH_3$ (B.P. 30° C.); trichlorofluoromethane (B.P. 23.8° C.; dichlorofluoromethane (B.P. about 14° C.); the dichlorotetrafluoroethanes (B.P.'s about −2 to 4° C.); $CF_3$-$CH_2Cl$ (B.P. 7° C.); octafluorocyclobutane (B.P. −6° C.)

Materials of boiling points lower than the freezing points of the solutions being treated, such as tetrafluoromethane and fluoroform, must be handled under pressure.

The most desirable solvents are those fluorocarbons which are liquid at ordinary ambient temperatures and preferably those which have boiling points above 40° C.; they can be handled without using pressure equipment, and are readily recoverable. Such solvents include, among others:

$CCl_2F$-$CCl_2F$ (B.P. 92.8° C.—M.P. 26° C.);
$CCl_2F$-$CClF_2$ (B.P. 47.6° C.);
$CCl_3$-$CClF_2$ (B.P. 91.5° C.);
$CH_2Br$-$CF_2Br$ (B.P. 93.4° C.);
$CF_3$-CHCl-$CH_2$-$CH_3$ (B.P. 58° C.); (S.G. 1.20);
$CH_3$-$CF_2$-CHCl-$CH_3$ (B.P. 72° C.) (S.G. 1.13);
$CBrF_2$-$CBrF_2$ (B.P. 47.5° C.);
Toluotrifluoride—$C_6H_5$-$CF_3$ (B.P. 103° C.);
Xylene Hexafluoride—$C_6H_4$ $(CF_3)_2$ (B.P. 114–115° C.)

Typical examples of our invention are as follows:

*Example 1.—Vaccinia Virus*

Vaccinia virus is one of the nucleoprotein materials which is widely studied in biological work. It is generally grown in fertile chicken eggs in which it occurs with very large concentrations of other proteins. Laboratory separation of the virus from other materials with which it is associated for the purpose of studying the virus has always been a very long drawn out procedure, if viability of the virus is to be preserved. Our invention simplifies this separation.

Fertile eleven day old chicken eggs were inoculated with vaccinia virus, and after four days development at 37° C., the chorioallantoic membranes were removed; while this tissue is rich in vaccinia virus (of nucleoprotein structure), it contains very large amounts of accompanying proteins.

Two grams of this tissue were mixed with 10 cc. of McIlvaine's buffer of pH 7.4 diluted 1:50 with distilled water and with 5 cc. of a 75:25 solution (S.G. 1.30) of symmetrical tetrachlorodifluoroethane (Freon 112) in n-heptane. The mixture was homogenized 5 minutes at high speed, and then centrifuged. There was a small top fatty layer, a large central aqueous layer containing most of the virus, and relatively free of other protein, and a bottom layer containing the proteins and some of the lipids.

Similar results were obtained by grinding the tissue in the buffer liquid, and homogenizing with the solvent. Unsymmetrical tetrachlorodifluoroethane and tri-chloro-tri-fluoro ethane, mixed with an alkane to get the same specific gravity, produced similar results.

The aqueous phase obtained in these experiments had a higher titer of viable vaccinia virus than the same amount of vaccinia infected tissue homogenized in an aqueous buffered system. It was possible to study the composition of the virus, and get good electron micrographs of it, in this system.

The example, when repeated with $CF_3$-CHCl-$CH_3$ (B.P. 30° C.—S.G. 1.3) and with $CF_3$-CHCl-$CH_2$-$CH_3$ (S.G. 1.2) gave excellent separations; when repeated with $CH_3$-$CF_2$-CHCl-$CH_3$ (S.G. 1.13), the example gave excellent separations, but longer centrifugal time was required.

The example was repeated with several brominated fluorocarbons and with the aralkyl xylene hexafluoride. A substantial reduction in virus strength was observed when these fluorocarbons were used full strength—there was apparently some toxic action on the virus. Mixtures with n-heptane to a specific gravity of 1.20–1.25 reduced the toxic action noticeably.

*Example 2.—Rous Sarcoma Virus*

The Rous sarcoma virus is a virus which produces a sarcoma in chickens; it is much used in cancer investigation, and its isolation in pure and viable form is desirable in such studies.

The procedures of Example 1 were repeated with Rous sarcoma virus grown in the chorioallantoic membranes of fertile eggs. Massive tumors, developed in four to five days, were removed and treated as in Example 1—homogenized with buffer solution and extracted. The aqueous buffered supernatant liquid was injected into another generation of eggs, and proved sufficiently stronger than the original virus preparation (an untreated homogenized tumor) to produce fresh tumors in 2 to 3 days. This was repeated through several generations of eggs. The supernatant could be reduced to a titer of $10^{-8}$ and still produce unmistakable sarcomas, while the original material containing protein could be reduced only to a titer of $10^{-6}$.

We believe the additional activity of our material is due to the removal of protein which cements the virus particles together. Examination in the electron microscope indicates the virus particles in our supernatant liquid to be substantially smaller in average particle size than those observable in the original homogenized tumor from which it was extracted.

*Example 3.—Vaccinia Virus—Low Boiling Extractant*

Example 1 was repeated, using trichlorofluoromethane (B.P. 23.8° C.—S.G. 1.466) reduced to 1.25 S.G. with n-heptane. Essentially similar results were obtained, except that difficulty was encountered due to evaporation of solvent unless the solvent-tissue homogenates were refrigerated in the range of 5–10° C.

Materials of lower boiling point (e.g. dichlorofluoromethane, dichlorotetrafluorethane etc.) are more difficult to handle.

*Example 4.—Vaccinia Virus—Brominated Extractant*

Example 1 was repeated, using 1 bromo-2 difluoro bromo ethane (B.P. 93.4° C.—S.G. 2.224). When used alone, the fluorocarbon removed not only the ordinary protein, but a large part of the vaccinia virus from the aqueous fluid. When adjusted to S.G. 1.25 with n-heptane (62.5% heptane—37.5% fluorocarbon) the separation was almost complete in a single operation.

The above-described methods may of course be applied to other nucleoprotein and nucleic acid mixtures with proteins. All that is required is that an aqueous fluid, preferably buffered, be homogenized with the halofluorocarbon, and then separated into layers—the protein separates with the fluorocarbon bottom layer, while the nucleoproteins stay with the aqueous supernatant in the upper layer.

The method is useful in the study of plant viruses as well as animal viruses.

One of the principal advantages of our process, as compared with prior processes for separating nucleoproteins from proteins in aqueous media, is that our process causes no change in the natural pH of the fluid. It is well known that pH differences cause various changes in the state of dispersion of proteins, and often result in their denaturing. Furthermore, where pH adjustments are desired, they can be made in our process with the assurance that no further change will occur.

Our method is of course applicable to many other problems than those specifically described. For example, it is possible to concentrate the proteins in aqueous plant and animal extracts, without danger of denaturing them. The proteins may be recovered from the fluorocarbon medium by evaporation of the fluorocarbon under vacuum at low temperatures.

This application is a continuation-in-part of our applications Serial No. 467,886 filed November 9, 1954, and Serial No. 605,429 filed August 21, 1956, both now abandoned.

We claim:
1. The method of separating nucleoproteins and nucleic acids from other protein material in admixtures therewith in aqueous liquid media, which comprises bringing the aqueous liquid into initimate admxture wth a liquid extracting agent consisting essentially of a carbon fluorine compound containing no elements other than carbon, fluorine, hydrogen, chlorine and bromine, of the group consisting of (1) saturated aliphatic and alicyclic compounds containing from 1 to 4 carbon atoms, at least 3 halogen atoms, at least 1 fluorine atom for each 2 carbon atoms, and in which any monohalogenated alkyl radical is alpha to a polyfluorosubstituted carbon atom and (2) a methyl benzene in which all the hydrogens of the methyl groups are replaced by fluorines, and thereafter separating the mixed liquid into a layer containing the water from the aqueous fluid, with the nucleoprotein, nucleotide and nucleic acid materials therein, and a layer containing the halofluoro hydrocarbon with the other proteins therein.

2. The method of claim 1, in which the extracting liquid is adjusted to a specific gravity of from 1.1 to 1.6 with an alkane.

3. The method of claim 1, in which the extracting liquid has a boiling point above 40° C.

4. The method of claim 1, in which the extracting agent is a fluorochloroalkane.

5. The method of claim 1, in which the protein is recovered from the halofluoro hydrocarbon layers.

6. The method of separating nucleoproteins and related materials from other proteins contained with them in aqueous fluids, without substantial removal of the nucleoprotein material from the aqueous fluids, which comprises intimately admixing the aqueous fluid with a liquid consisting essentially of a fluoroalkane containing 1 to 4 carbon atoms, and no other substituents than hydrogen, chlorine and bromine, at least 3 halogen atoms, at least 1 fluorine atom for each 2 carbon atoms, and free of mono-substituted halogenated alkyl radicals not alpha to a polyfluorinated carbon atom and separating the mixture into an aqueous layer containing the nucleoprotein and a non-aqueous layer containing the other protein.

7. The method of claim 6, in which the extracting liquid is adjusted to a specific gravity of from 1.1 to 1.6 with an alkane.

8. The method of claim 6, in which the extracting liquid has a boiling point above 40° C.

References Cited in the file of this patent

UNITED STATES PATENTS 2,619,425    Levin _____ Nov. 25, 1952

FOREIGN PATENTS 506,095    Great Britain _____ May 23, 1939

OTHER REFERENCES

Anglesio: Minerva Medica, 39:1, pp. 516, 521, 528, May 26, 1948.